United States Patent
Staudinger et al.

(10) Patent No.: US 8,527,164 B2
(45) Date of Patent: Sep. 3, 2013

(54) METHOD FOR CONTROLLING AND/OR REGULATING AN AUTOMATED TRANSMISSION

(75) Inventors: Joachim Staudinger, Ravensburg (DE); Lutz Mueller, Herdwangen-Schoenach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/497,280

(22) PCT Filed: Aug. 31, 2010

(86) PCT No.: PCT/EP2010/062677
§ 371 (c)(1),
(2), (4) Date: Mar. 21, 2012

(87) PCT Pub. No.: WO2011/039018
PCT Pub. Date: Apr. 7, 2011

(65) Prior Publication Data
US 2012/0245810 A1    Sep. 27, 2012

(30) Foreign Application Priority Data
Sep. 29, 2009    (DE) .................. 10 2009 045 091

(51) Int. Cl.
*G06F 7/00*    (2006.01)
(52) U.S. Cl.
USPC ............................................... 701/52; 477/81
(58) Field of Classification Search
USPC ........................................ 701/52; 477/79, 81
See application file for complete search history.

(56) References Cited

U.S. PATENT DOCUMENTS

| | | | |
|---|---|---|---|
| 4,252,208 A * | 2/1981 | Heidemeyer et al. | 180/165 |
| 4,454,789 A | 6/1984 | Kaspar et al. | |
| 4,679,145 A * | 7/1987 | Beeck et al. | 701/51 |
| 5,733,223 A * | 3/1998 | Matsubara et al. | 477/175 |
| 6,849,029 B2 | 2/2005 | Loeffler | |
| 6,939,265 B2 | 9/2005 | Rustige et al. | |
| 7,935,024 B2 * | 5/2011 | Winkel et al. | 477/80 |
| 8,086,379 B2 * | 12/2011 | Sugiura et al. | 701/52 |
| 8,095,284 B2 * | 1/2012 | Nagashima et al. | 701/51 |
| 8,116,952 B2 * | 2/2012 | Sugiura et al. | 701/51 |
| 8,135,521 B2 * | 3/2012 | Sugiura et al. | 701/52 |
| 2009/0171542 A1 * | 7/2009 | Sugiura et al. | 701/52 |
| 2010/0100290 A1 | 4/2010 | Sauter et al. | |
| 2012/0220422 A1 * | 8/2012 | Wurthner et al. | 477/79 |
| 2012/0220424 A1 * | 8/2012 | Staudinger et al. | 477/80 |

FOREIGN PATENT DOCUMENTS

| | | |
|---|---|---|
| DE | 195 07 622 A1 | 9/1995 |
| DE | 102 21 701 A1 | 11/2002 |
| DE | 101 60 819 A1 | 6/2003 |
| DE | 10 2007 035 426 A1 | 1/2009 |
| DE | 10 2008 042 959 A1 | 4/2010 |

* cited by examiner

*Primary Examiner* — Russell Frejd
(74) *Attorney, Agent, or Firm* — Davis & Bujold, PLLC

(57) ABSTRACT

A method of controlling and/or regulating an automated transmission of a vehicle in which a rolling function or a coasting function of the vehicle is activated in an automatic mode, under predetermined conditions, such that the drivetrain is disengaged and the drive motor is one of operated at idle or is switched off at times. The rolling function or the coasting function is automatically terminated if at least one of the predetermined conditions is no longer present. The rolling function or the coasting function can also be terminated manually by the driver, and a manually operable shifting strategy can be initiated.

15 Claims, 1 Drawing Sheet

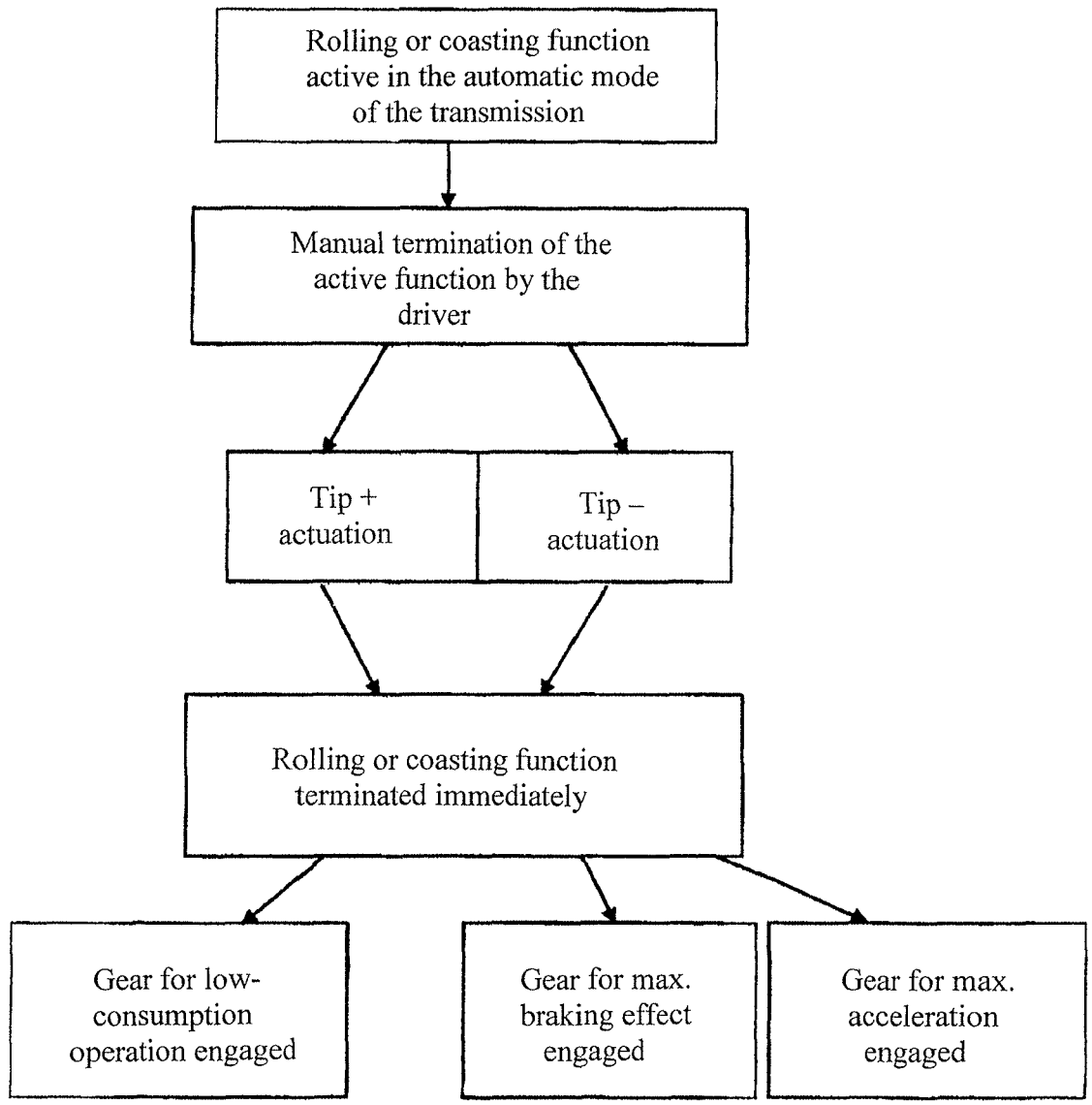

METHOD FOR CONTROLLING AND/OR REGULATING AN AUTOMATED TRANSMISSION

This application is a National Stage completion of PCT/EP2010/062677 filed Aug. 31, 2010, which claims priority from German patent application serial no. 10 2009 045 091.2 filed Sep. 29, 2009.

FIELD OF THE INVENTION

The present invention concerns a method for controlling and/or regulating an automated transmission.

BACKGROUND OF THE INVENTION

Automated transmissions are known from automotive technology. Such transmissions can be operated inter alia in an automatic mode, in which the operation of the transmission is governed by the transmission control system. It is also known that a so-termed manual mode is available in which, the driver can manually select a higher or a lower gear by actuating a tip key.

During the automatic mode, under certain conditions a so-termed rolling function or coasting function can be activated by the transmission control system in order to thereby save fuel. When the rolling function is activated the drive-train is opened and the drive motor is operated in the idling mode. The motor can also be switched off in order to further reduce fuel consumption when the coasting function is activated. As soon as the conditions required for activating the rolling function or the coasting function are no longer being met, the rolling or coasting function is automatically terminated by the transmission control system.

For example, from the document DE 102 21 701 A1 a control method for motor vehicles with an automated clutch device is known. If no brake or accelerator pedal actuation has taken place for a predetermined time interval, a coasting phase is activated automatically. As soon as the control system detects that one of the conditions required for this is no longer being met, the coasting phase is automatically terminated. After the end of the coasting phase, the control system transmits a rotational speed parameter or a torque parameter in order to regulate the internal combustion engine to a desired speed. As soon as the control system determines that the rotational speeds of the motor and the transmission are synchronized, the clutch is automatically engaged again.

From the document DE 10 2007 035 426 A1 a display device and an operating method for a motor vehicle with a drive-train are known, wherein the display device signals the drive situation, for example the coasting situation. In this way the driver can be assisted to make use of the energy-efficient coasting operation as often as possible.

The known methods have the disadvantage that the coasting function can only be activated or deactivated automatically, so the attempt is made to produce the prerequisites for activating or deactivating the coasting function. The driver has no means for direct manual intervention. Furthermore, in the automatic mode, when the coasting function or the rolling function has ended, the driver has no way to influence the subsequent shifting strategy of the transmission control system.

SUMMARY OF THE INVENTION

The purpose of the present invention is to propose a method of the type described at the beginning, with which the driver has a direct influence in relation to the coasting or rolling function, even in the automatic mode.

Accordingly, a method for controlling and/or regulating an automated transmission of a vehicle is proposed, in which, when in an automatic mode and under predetermined conditions, a rolling function or a coasting function of the vehicle is activated, during which the drive-train is opened and the drive motor is operated in the idling mode or is switched off at times, but the rolling or coasting function is terminated immediately if at least one of the predetermined conditions is no longer being met.

According to the invention it is provided that the rolling function or coasting function can also be deliberately terminated manually by the driver, and after the rolling or coasting function has ended the driver can initiate a shifting strategy that he can influence.

In this way, not only in the manual mode as already known, but also in the automatic mode or an automatic shifting program, the driver can deliberately influence the manner in which the transmission is operated and thus specify to the transmission control system a particular shifting strategy.

In an advantageous embodiment variant of the method according to the invention it can be provided that the driver actuates a particular switch when necessary, for example the driving switch or a switch on the steering column, in order to thereby signal his wish to the transmission control system for influencing the operating mode. By actuating the switch, the active rolling function or coasting function can be terminated deliberately and a shifting strategy associated with the switch concerned can be initiated for engaging the drive-train again.

For example, by actuating a so-termed tip-minus key during an active rolling or coasting function, the function can be abandoned or terminated and a gear for maximum acceleration of the vehicle can be selected and engaged. With reference to the driving condition parameters existing at the time, the transmission control system then first selects an appropriate gear as closely matched as possible to the maximum torque of the motor.

Another possible way for deliberately influencing the operating mode of the transmission can provide that by actuating the tip-minus key, the active rolling function or coasting function is terminated immediately and, as an alternative, a gear is selected and engaged which produces a maximum motor braking effect. Thus, the transmission control system can be influenced by the driver in such manner that after abandoning the rolling or coasting function a gear is selected, which brings the engine speed into a definably applicable high-speed range so that the desired motor braking action, which also increases with increasing motor speed, is produced.

According to a further possible version of the invention it can be provided that by actuating a tip-plus key the driver immediately terminates the active rolling function or coasting function and signals to the transmission control system that a gear should be selected, in which the vehicle operates with the lowest possible fuel consumption. For this a motor speed range can be specified, within which the motor should be operated once the drive-train has been engaged. This speed range is applicable and is usually located in the lower speed range.

Thus, with the method according to the invention, for example by operating a tip lever during an active rolling or coasting function, the driver can deliberately influence the operating mode of the transmission and, besides the deliberate termination of the active function, a shifting strategy desired by the driver for engaging the drive-train can also be initiated.

BRIEF DESCRIPTION OF THE DRAWING

Below, the present invention is explained further with reference to the sole drawing. The single FIGURE of the invention shows a possible flow chart of an embodiment variant of the method according to the invention for controlling and/or regulating an automated transmission of a vehicle.

DETAILED DESCRIPTION OF THE PREFERRED EMBODIMENTS

In the method according to the invention it is provided that when a rolling or coasting function has been activated in the automatic mode of the transmission, by taking deliberate action, the driver can terminate the active rolling function or coasting function and can initiate a desired shifting strategy.

For this, for example the driver can actuate the tip-plus key or the tip-minus key. If the driver actuates the tip-plus key, the rolling or coasting function is terminated immediately and a gear for operation with low consumption is selected and engaged by the transmission control system.

If the driver actuates the tip-minus key, the rolling or coasting function is likewise terminated immediately and a gear is engaged, which produces a maximum motor braking action on the vehicle. Alternatively, it can also be provided that when the tip-minus key is actuated, a gear is selected by the transmission control system which enables maximum acceleration of the vehicle.

The invention claimed is:

1. A method of at least one of controlling and regulating an automated transmission of a vehicle, in which, in an automatic mode and under predetermined conditions either a rolling function or a coasting function of the vehicle is activated, during which the drive-train is disengaged and the drive motor is either operated in the idling mode or switched off at times, the method comprising the steps of:
   automatically terminating the rolling or the coasting function if at least one of the predetermined conditions is no longer present; and
   manually terminating the rolling function or the coasting function and initiating a manually influenced predetermined shifting strategy with the predetermined shifting strategy being independent of a normal shifting strategy.

2. The method according to claim 1, further comprising the step of immediately terminating the rolling function or the coasting function by manually actuating a driving switch and implementing the predetermined shifting strategy that is associated with the driving switch.

3. The method according to claim 1, further comprising the step of immediately terminating the rolling function or the coasting function and engaging a gear for maximum acceleration of the vehicle by manually actuating a tip-minus key of the driving switch.

4. The method according to claim 1, further comprising the step of immediately terminating the rolling function or the coasting function and engaging a gear that produces a maximum motor braking action by manually actuating a tip-minus key of the driving switch.

5. The method according to claim 1, further comprising the step of immediately terminating the rolling function or the coasting function and engaging a gear that enables low-consumption operation by manually actuating a tip-plus key of the driving switch.

6. A method of at least one of controlling and regulating an automated transmission of a vehicle, the method comprising the steps of:
   automatically actuating either a rolling function or a coasting function of the vehicle when the automated transmission is operating in an automatic mode and predetermined conditions are met;
   disengaging a drive-train of the vehicle and, when the rolling function is actuated, operating a drive motor in an idling mode and, when the coasting function is actuated, switching off the drive motor;
   automatically terminating either the rolling function or the coasting function when the predetermined conditions are no longer present; and
   manually terminating either the rolling function or the coasting function and initiating a predetermined transmission shifting strategy by manually actuating a key, and the predetermined shifting strategy being independent of a normal shifting strategy.

7. The method according to claim 6, further comprising the step of manually terminating either the rolling function or the coasting function by actuating a tip-minus key and engaging either a gear for maximum acceleration of the vehicle or a gear that produces a maximum motor braking action.

8. The method according to claim 7, further comprising the step of manually terminating either the rolling function or the coasting function by actuating a tip-plus key and engaging a gear that enables low-consumption operation of the vehicle.

9. A method of at least one of controlling and regulating an automated transmission of a vehicle, the method comprising the steps of:
   automatically actuating either a rolling function or a coasting function of the vehicle when the automated transmission is operating in an automatic mode and predetermined conditions are met;
   disengaging a drive-train of the vehicle and, when the rolling function is actuated, operating a drive motor in an idling mode and, when the coasting function is actuated, switching off the drive motor;
   automatically terminating the rolling or the coasting function when at least one of the predetermined conditions is no longer present;
   upon manual actuation of an actuator, automatically terminating either the rolling function or the coasting function and implementing a predetermined transmission shifting strategy that is independent of a normal shifting strategy.

10. The method according to claim 9, further comprising the steps of selecting between and implementing one of a plurality of predetermined transmission shifting strategies upon actuation of the actuator, and
   basing one of the plurality of predetermined transmission shifting strategies implemented on a manner in which the actuator is manually actuated.

11. The method according to claim 10, further comprising the step of providing a tip key as the actuator.

12. The method according to claim 11, further comprising the steps of, when the tip key is actuated in a minus direction, terminating either the rolling function or the coasting function and engaging either a gear for maximum acceleration of the vehicle or a gear for producing maximum motor braking action, and
   engaging a gear that enables low-consumption operation of the vehicle, when the tip key is actuated in a plus direction.

13. The method according to claim 9, further comprising the step of providing a tip key as the actuator.

14. The method according to claim 9, further comprising the step of implementing a different shift strategy when the actuator is actuated than when one of the predetermined conditions is no longer present.

15. The method according to claim 9, further comprising the step of selecting between and implementing one of a plurality of predetermined transmission shifting strategies upon one of a plurality of manners of actuation of the single actuator.

* * * * *